(12) United States Patent
Mizuno et al.

(10) Patent No.: US 10,088,825 B2
(45) Date of Patent: Oct. 2, 2018

(54) TOOL PATH CURVE GENERATION METHOD AND TOOL PATH CURVE GENERATION APPARATUS

(71) Applicant: FANUC Corporation, Yamanashi (JP)

(72) Inventors: Tohru Mizuno, Yamanashi (JP); Takuji Chiba, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 283 days.

(21) Appl. No.: 14/952,904

(22) Filed: Nov. 25, 2015

(65) Prior Publication Data
US 2016/0154400 A1    Jun. 2, 2016

(30) Foreign Application Priority Data

Nov. 28, 2014    (JP) ................... 2014-242013

(51) Int. Cl.
G06F 19/00    (2018.01)
G05B 19/31    (2006.01)
G05B 15/02    (2006.01)
G05B 19/4103    (2006.01)

(52) U.S. Cl.
CPC ............. *G05B 19/31* (2013.01); *G05B 15/02* (2013.01); *G05B 19/4103* (2013.01); *G05B 2219/50336* (2013.01)

(58) Field of Classification Search
None
See application file for complete search history.

(56) References Cited

U.S. PATENT DOCUMENTS

| | | | |
|---|---|---|---|
| 5,028,855 A | | 7/1991 | Distler et al. |
| 5,566,288 A | * | 10/1996 | Koerhsen ............... G06F 17/17 345/442 |
| 2004/0122549 A1 | * | 6/2004 | Otsuki ............... G05B 19/4103 700/189 |
| 2006/0247820 A1 | | 11/2006 | Otsuki et al. |
| 2013/0218323 A1 | | 8/2013 | Otsuki |

FOREIGN PATENT DOCUMENTS

| | | |
|---|---|---|
| CN | 101109944 A | 1/2008 |
| CN | 101907876 A | 12/2010 |
| EP | 0384925 A1 | 9/1990 |

(Continued)

OTHER PUBLICATIONS

Pottmann et al., On optimal tolerancing in Computer-Aided Design, 2000, IEEE, Geometric Modeling and and Processing, pp. 347-363 (Year: 2000).*

(Continued)

*Primary Examiner* — Miranda M Huang
*Assistant Examiner* — Hung H Dang
(74) *Attorney, Agent, or Firm* — Hauptman Ham, LLP (57) ABSTRACT

A tool path curve generation method for generating a curve from a tool path designated by a command point sequence includes: a step of defining a region based on a polygonal line path connecting the command point sequence; a step of determining whether the curve is included in the region on the basis of the geometric shape of the surface of the region; and a step of generating a curve that has been determined to be included in the region in the determination step.

2 Claims, 6 Drawing Sheets

(56) References Cited

FOREIGN PATENT DOCUMENTS

| JP | 9-160623 A | 6/1997 |
|---|---|---|
| JP | 10-240329 A | 9/1998 |
| JP | 3366213 B2 | 1/2003 |
| JP | 2004-078516 A | 3/2004 |
| JP | 2005-182437 A | 7/2005 |
| JP | 2006-309645 A | 11/2006 |
| JP | 2007-293478 A | 11/2007 |
| JP | 2013-171376 A | 9/2013 |

OTHER PUBLICATIONS

Office Action dated Jan. 26, 2016, in Japanese Patent Application No. 2014-242013.

Piegl, et al., "The NURBS Book," 2nd. Ed. (Nov. 14, 1996), pp. 405-453, Springer-Verlag.

Schoenberg, "Spline Functions and Problem of Graduation", Proceedings of the National Academy of Sciences of the U.S.A., 52 (Aug. 18, 1964), pp. 947-950.

Goldstein, "Lagrange's Method of Undetermined Multipliers," Classical Mechanics, (1967), pp. 46-51, Addison-Wesley Publishing Company, Inc.

Office Action in CN Application No. 201510843828.8, dated May 2, 2017.

Office Action in DE Application No. 102015120118.6, dated Feb. 5, 2018, 9 pp.

\* cited by examiner

FIG. 12

TOOL PATH CURVE GENERATION METHOD AND TOOL PATH CURVE GENERATION APPARATUS

RELATED APPLICATIONS

The present application claims priority to Japanese Application Number 2014-242013, filed Nov. 28, 2014, the disclosure of which are hereby incorporated by reference herein in its entirety.

BACKGROUND OF THE INVENTION

Field of the Invention

The present invention relates to a tool path curve generation method and a tool path curve generation apparatus that ensure a shape error of a predetermined value or less.

Description of the Related Art

There have been widely known methods for determining a curve that interpolates a given point sequence or a curve that passes by each point of a point sequence (Les Piegl, Wayne Tiller, The NURBS Book, Springer-Verlag, pp 405-453, and I. J. Schoenberg, Spline functions and the problem of graduation, Proceedings of the National Academy of Sciences of the U.S.A., 52 (1964), pp 947-950). In a machining process by a numerically controlled machine tool, these methods are used for converting a tool path formed of a point sequence into a curve in order to achieve a smoother machined surface and reduced machining time (Japanese Patent Application Laid-Open No. 2013-171376, Japanese Patent Application Laid-Open No. 2007-293478, Japanese Patent Application Laid-Open No. 2006-309645, Japanese Patent Application Laid-Open No. 2005-182437, Japanese Patent Application Laid-Open No. 2004-078516, and Japanese Patent Application Laid-Open No. H10-240329).

In general, the length of a machining program varies depending on a workpiece. Time-consuming machining involves an extremely large number of points constituting a tool path, and therefore, it is difficult to complete the conversion of the tool path into a curve in one process. For this reason, a method has been used in which a point sequence is divided up to generate curves in small increments. This method is inevitably used to generate curves and perform machining in parallel.

The curves generated from divided groups of points are expressed in the form of parametric curves. An expression form, such as a B-spline curve or a NURBS curve, which is suited for each application, is adopted.

In creating the curves of point sequences described above, efforts were initially focused on the generation of curves (interpolation curves) that pass the points of a point sequence. However, the recent tendency is toward creating curves that pass by a point sequence (approximated curve) rather than curves that pass a point sequence, mainly taking into account a shape error that occurs when creating a machining program by CAM. An approximated curve is generally conditioned that each point of a point sequence lies within a predetermined distance from the curve (Japanese Patent Application Laid-Open No. 2013-171376).

While a curve generated from a point sequence provides a smooth path, the curve is required to pass by an original point sequence. For this reason, according to a conventional method for creating curves, a curve is generated such that the distance between each point of a point sequence and a point corresponding thereto on the curve will take a preset value or less.

However, according to the foregoing method, the attention is focused on the distance from a curve only at a command point, so that the curve may considerably deviate from the point sequence at other places. This has been posing a problem in that the method cannot be applied to a case where the shape error of a tool path resulting from the generation of curves is desirably controlled to a predetermined value or less.

Further, Japanese Patent Application Laid-Open No. H10-240329 describes a method in which, in the case of an interpolation curve, some points are taken on a curve sandwiched between command points, and the distance between a segment that connects the command points and each of the points is observed. This method allows more detailed determination than the method in which the distance is observed only at command points. However, the section sandwiched between adjacent points is not checked, thus failing in principle to ensure that an error is an allowable value or less.

SUMMARY OF THE INVENTION

Accordingly, the present invention has been made to solve the foregoing problem with the generation of curves according to the prior arts, and it is an object of the invention to provide a tool path curve generation method and a tool path curve generation apparatus which ensure a shape error such that an entire generated curve lies within a predetermined region as observed from an original point sequence.

The present invention provides a method for generating curves from a tool path drawn in the form of a point sequence. According to the method, a curve is generated such that a shape error between a generated curve and an original path becomes a specified value or less. A conventional method for generating a curve is used. More specifically, a control point, which is a variable for changing the shape of a curve is introduced, and the position of the control point is determined such that the sum of the distances between the curve and each point of a point sequence is minimized. The method for expressing the curve having the control point as a variable and for determining the control point adopts the technique for determining an approximated curve described in "Les Piegl, Wayne Tiller, The NURBS Book, Springer-Verlag, pp 405-453."

After the number of the control points is given to define a curve, the distance between a command point and the curve is determined. Then, the control point is repeatedly added to generate the curve and the distance between the added control points and the curve is repeatedly checked until the distances of all control points become the specified value or less. If all the command points lie within a specified distance from the curve, then it is determined whether the generated curve is included in a space region based on a polygonal line path that connects the point sequence. The control points are repeatedly added to generate the curve, and the distance is repeatedly checked until the entire curve is included in the specified region, thereby obtaining a desired curve.

A simplest example of such a region is connected cylinders having their axes formed of individual segments constituting the polygonal line. However, the method in accordance with the present invention is not limited to such a cylindrical region. Instead, the region may be more generally made of a rotating body formed by rotating a curve, which is expressed by x=f(z), about a Z-axis in a coordinate system having the axis of the segment defined as the Z-axis. Further, the determination unit uses only the information on a generated curve and is independent of the method itself for generating curves, enabling the determination unit to be applied regardless of the method for generating curves.

Further, the tool path curve generation method in accordance with the present invention is a method for generating a curve from a tool path designated by a command point sequence, and includes: a step of defining a region based on a polygonal line path connecting the command point sequence; a step of determining whether the curve is included in the region on the basis of the geometric shape of the surface of the region; and a step of generating a curve that has been determined to be included in the region in the determination step.

The tool path curve generation method makes it possible to designate the shape of the region by setting.

The region may be a rotating body formed by rotating a curve about an axis that is a segment connecting adjacent command points.

A tool path curve generation apparatus in accordance with the present invention is adapted to generate a curve from a tool path designated by a command point sequence, and includes: a definition unit that defines a region based on a polygonal line path connecting the command point sequence; a determination unit that determines whether the curve is included in the region on the basis of the geometric shape of the surface of the region; and a curve generation unit that generates a curve determined to be included in the region by the determination unit.

The tool path curve generation apparatus allows the shape of the region to be specified by setting.

The region may be a rotating body formed by rotating a curve about an axis that is a segment connecting adjacent command points.

To create curves from a machining path formed of a point sequence, the present invention provided with the steps or configuration described above makes it possible to obtain a curve, the distance of which from a polygonal line path that connects the point sequence does not exceed a predetermined value.

Further, the shape of the region can be specified by setting, thus making it possible to control the deviation of a curve from an original point sequence to a desired range for each machining program when generating curves of a machining path formed of the point sequence.

Further, the region is made of a rotating body formed by rotating a curve about an axis that is a segment connecting adjacent command points. Hence, when creating curves from a machining path formed of a point sequence, the distance between the curve and a polygonal line path is allowed to be larger between adjacent points than at the points, thus permitting flexible curve generation.

As described above, the present invention equipped with the foregoing steps or configuration makes it possible to provide a tool path curve generation method and a tool path curve generation apparatus which ensure a shape error that causes the entire generated curve to be included in a predetermined region as observed from an original point sequence.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

The following will describe an embodiment of the present invention with reference to the accompanying drawings. Unless otherwise specified, the product of vectors will indicate an inner product.

First, the terms used in the present description will be defined. Each point sequence obtained by division to generate a curve is defined as a partial point sequence, and a curve generated from the partial point sequence will be defined as an arc. Further, a region which is defined on the basis of a polygonal line path connecting the points of a partial point sequence and in which a curve should be included so as to ensure the shape error of the curve is defined as an allowable region. The allowable value of the distance between each point of the partial point sequence and the curve or the distance between a segment that connects the points of the partial point sequence and the curve is defined as a tolerance.

Figure 1:
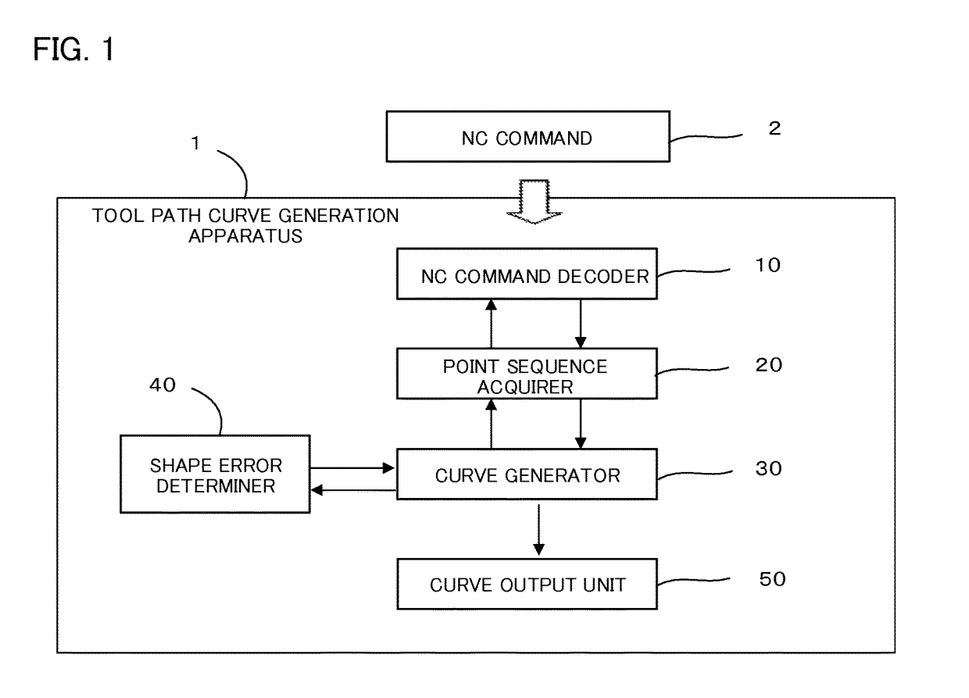
FIG. 1 is a block diagram illustrating the configuration of a tool path curve generation apparatus.

The method in accordance with the present invention will be specifically described. FIG. 1 is a block diagram illustrating a tool path curve generation apparatus, which is an embodiment of the present invention. A tool path curve generation apparatus 1 includes an NC command decoder 10, a point sequence acquirer 20, a curve generator 30, a shape error determiner 40, and a curve output unit 50.

Figure 2:
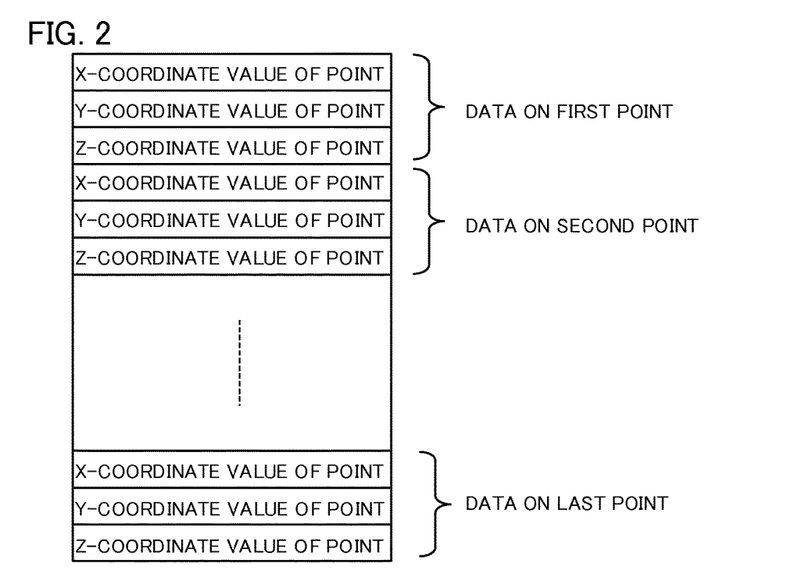
FIG. 2 is a diagram illustrating an example of point sequence data.

The NC command decoder 10 is identical to an NC command decoder mounted on a numerical controller, which controls a machine tool, and decodes an NC command 2 (machining program) to extract point sequence data of a point sequence constituting a tool path. The point sequence data is the data that indicates the positions of points on the tool path. In the case of five-axis machining, the point sequence data also includes the data that indicates the orientation of a tool. FIG. 2 illustrates the configuration of the point sequence data for three-axis machining. The data on one point is composed of the coordinates X, Y and Z of the distal end of a tool, and the same quantity of pieces of this data as the number of points is included in the point sequence data.

The point sequence acquirer 20 sends a request to the NC command decoder 10 to acquire necessary point sequence data. Basically, the data on the points of a predetermined number N is acquired. If there is a place determined to have a bend point of a tool path in the requested point sequence, then the point sequence data up to the bend point is acquired. The curve generator 30 generates an arc. The arc is a parametric curve that passes the start point and the end point of a partial point sequence and passes by the remaining points. As the parametric curve, a B-spline curve is used. Alternatively, however, other type of curve, such as a NURBS curve or a partitioned polynomial curve, may be used. The arc is represented by expression (1).

$$\vec{C}(u) = \sum_{i=0}^{n} N_{i,3}(u)\vec{P}_i \qquad (1)$$

where u denotes a parameter of the curve and takes a value in a range defined by $0 \leq u \leq 1$; $N_{i,3}(u)$ denotes a three degree B-spline basis function; and $\vec{P}_i(u)$ denotes a control point of a B-spline curve.

The codomain of the parameter u is divided by a set of numbers called "knot" ($U = \{U_0, \ldots, U_{n+4}\}$). The B-spline basis function $N_{i,3}(u)$ depends on the knot. Thus, expression (1) represents a curve, using a knot and a control point as variables. Deciding the values of the variables defines the curve. There are several methods available for defining the curve as represented by expression (1), but the descriptions thereof will be omitted, because they are widely known, as described in "Les Piegl, Wayne Tiller, The NURBS Book, Springer-Verlag, pp 405-453, and I. J. Schoenberg, Spline functions and the problem of graduation, Proceedings of the National Academy of Sciences of the U.S.A., 52 (1964), pp 947-950".

Figure 3:
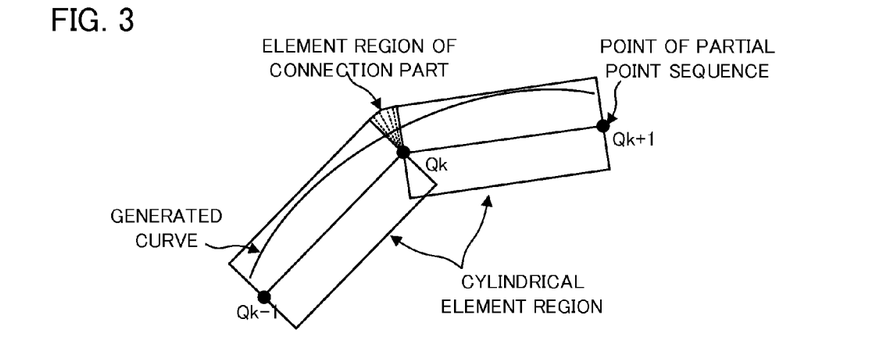
FIG. 3 is a diagram illustrating an element region constituting an allowable region.

Ensuring the shape error of a curve means to verify that the curve represented by expression (1) is included in an allowable region. The allowable region is formed of connected element regions, each of which is defined for each segment constituting a polygonal line. In the following description, for the purpose of simplicity, the element regions will be cylinders each having a segment as its axis and a tolerance as its radius, and a sphere that covers a cylinder connection part in which a curve is included in neither of the cylinders (FIG. 3).

When the element region is denoted by Di and an element of the curve corresponding to the element region Di (the method for determining the element will be described later) is denoted by Ci, the curve being included in the allowable region can be represented by expression (2).

$$C_i \subseteq D_i (i=1,2,\ldots,N_d) \qquad (2)$$

where Nd denotes the number of the element regions.

A curve with the ensured shape error is generated as follows. The values of the numbers of the knots and the control points are decided to generate a curve according to the method described in Les Piegl, Wayne Tiller, The NURBS Book, Springer-Verlag, pp 405-453, or I. J. Schoenberg, Spline functions and the problem of graduation, Proceedings of the National Academy of Sciences of the U.S.A., 52 (1964), pp 947-950), and it is verified whether the curve is included in the allowable region. Until the curve is included in the allowable region, the knots and the control points are repeatedly added to generate curves and the verification is repeatedly performed, thereby generating the curve with an ensured shape error.

For a curve to be included in the allowable region, the distance of each point of the partial point sequence from the curve must be the tolerance or less. In other words, the relationship represented by expression (3) is required.

$$|\vec{C}(\overline{u}_k) - \vec{Q}_k| \leq \varepsilon (k=0,\ldots,N-1) \qquad (3)$$

where $\varepsilon$ denotes the tolerance; $\vec{Q}_k$ denotes a point of the partial point sequence; and $\overline{u}_k$ denotes the value of a parameter of a point closest to $\vec{Q}_k$ on the curve and $\vec{C}(\overline{u}_k)$ denotes the point.

Always verifying expression (2) leads to a high calculation load. Hence, in the foregoing verification, it is first checked whether each point of the partial point sequence lies within the allowable region according to expression (3). If a point that is not within the allowable region is found, then a knot and a control point are added to generate another curve without carrying out the verification according to expression (2). Only when expression (3) is satisfied, expression (2) is calculated for the verification.

Figure 4:
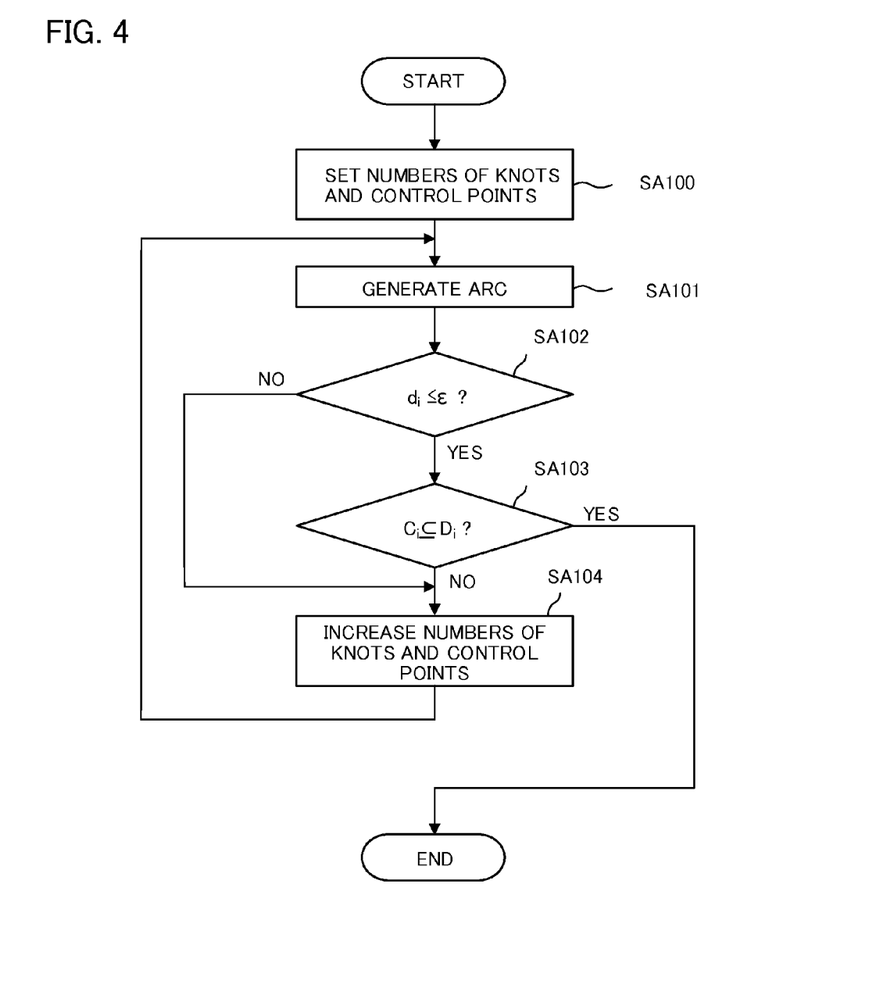
FIG. 4 is a flowchart illustrating the processing of generating an arc.

Referring now to the flowchart of FIG. 4, the procedure for actually generating a curve according to the foregoing method will be described.

Step SA100: Set the numbers of knots and control points to initial values.

Step SA101: Generate an arc.

Step SA102: Whether each point of the partial point sequence lies within a tolerance from the curve is determined according to expression (3). If all points lie within the tolerance, then the procedure proceeds to step SA103, or if not, then the procedure proceeds to step SA104.

Step SA103: Whether each curve element is included in its corresponding element region is determined according to expression (2). If all curve elements are included, then it means that the curve is obtained, so that the processing is terminated. If the determination result is negative, then the procedure proceeds to step SA104.

Step SA104: The numbers of knots and control points are increased, and the procedure returns to step SA101.

Figure 5:
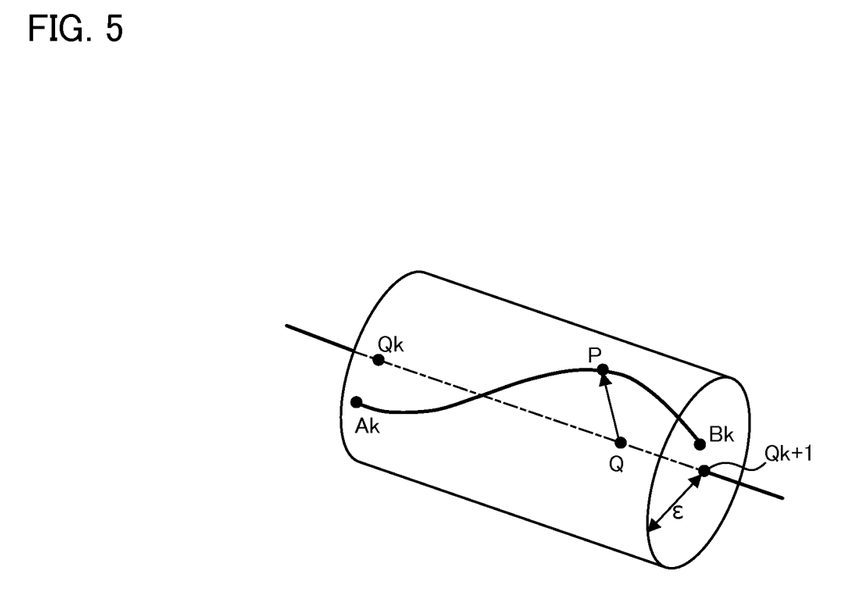
FIG. 5 is a diagram illustrating the intersection points of a cylindrical element region and a curve.

A description will now be given of the method for determining in the foregoing step SA103 whether the curve elements are included in their corresponding element regions. First, the case where the element region is cylindrical as illustrated in FIG. 3 will be described. The radius of the cylinder denotes the tolerance e. As illustrated in FIG. 5, the points that provide both ends of the axis of the cylinder are denoted by Qk and Qk+1, and the intersection points between the plane that pass Qk and Qk+1 and are orthogonal to the axis of the cylinder and the curve are denoted by Ak and Bk, and a curve length from Ak to Bk is denoted by Lk.

First, a first method will be described. This method is used to verify that the maximum value of the length of a perpendicular drawn from a point P on a curve section sandwiched between Ak and Bk down to the axis of the cylinder is the tolerance or less. The foot of the perpendicular is denoted by Q, and the point at which the length of PQ reaches a maximum value is determined. If the maximum value is the tolerance or less, then the curve is included in the cylinder. The maximum value lies either at the end point Ak or Bk of the section or at a point at which the length of PQ takes an extreme value therebetween. Hence, the distance between each of these points and the curve is determined and a maximum value among the obtained results is adopted.

At the point where the length of PQ takes an extreme value, a tangent $\vec{C}'(v)$ of the curve at P, the position thereof is denoted by $\vec{C}(v)$, and PQ will be orthogonal to each other, where the differential related to a parameter of the curve is denoted by a dash ('): $\vec{C}'(v)=d\,\vec{C}(v)/dv$ The position of Q is represented by expression (4), using the parameter u.

$$\vec{Q}(u)=\vec{Q}_k+\frac{u-\overline{u}_k}{\overline{u}_{k+1}-\overline{u}_k}(\vec{Q}_{k+1}-\vec{Q}_k) \quad (4)$$

$$=\vec{Q}'u+\frac{\overline{u}_{k+1}}{\Delta \overline{u}_k}\vec{Q}_k$$

However, the relationship represented by expression (5) must be satisfied.

$$\overline{u}_k \le u \le \overline{u}_{k+1}, \quad \vec{Q}(\overline{u}_k)=\vec{Q}_k, \quad \vec{Q}(\overline{u}_{k+1})=\vec{Q}_{k+1} \quad (5)$$

$$\Delta \overline{u}_k \equiv \overline{u}_{k+1}-\overline{u}_k, \quad \Delta \vec{q}_k \equiv \vec{Q}_{k+1}-\vec{Q}_k, \quad \vec{Q}' \equiv \frac{\Delta \vec{q}_k}{\Delta \overline{u}_k}$$

where $u_k$ denotes the ratio of the length of the polygonal line from the start point of the partial point sequence to Qk with respect to the total length of the polygonal line (the length from the start point to the end point of the partial point sequence). The relationship represented by expression (6) holds between parameters of $\vec{C}(v)$ and $\vec{Q}(u)$.

$$u=\frac{\Delta \overline{u}_k}{(\Delta \vec{q}_k)^2}\left(\sum_{i=0}^{n} N_{i,3}(v)\Delta \vec{q}_k \vec{P}_i - \overline{u}_{k+1}\Delta \vec{q}_k \vec{Q}_k\right) \quad (6)$$

Then, expression (7) is derived from the orthogonality condition between the tangent $\vec{C}'(v)$ and P Q.

$$\vec{C}'(v)(\vec{C}(v)-\vec{Q}(u))=0 \quad (7)$$

From expression (4), expression (5) and expression (6), solving expression (7), which is a fifth degree equation related to the parameter v, determines the parameter of the point at which the length of PQ takes an extreme value. Thus, the positions of P and Q are determined, and the maximal value (or the minimal value) of the length can be obtained. The solution of the fifth degree equation is determined using the Newton method. The codomain of the parameter is defined by 0≤u≤1, and therefore no extreme value exists in some cases. In such a case, the distance will be maximum at the end point Ak or Bk. The Newton method is a well-known method, so that the description thereof will be omitted.

AkQk and QkQk+1 are orthogonal to each other. Therefore, when the position of Ak is denoted by $\vec{C}'(v_k)$, the length of AkQk is represented by expression (8).

$$\vec{Q}'(\vec{C}(v_k)-\vec{Q}_k)=0 \quad (8)$$

Expression (8) is a three degree equation related to $v_k$, so that the solution thereof can be easily obtained. The position of Bk is determined in the same manner. Thus, the extreme values of AkQk, BkQk+1, and PQ have been determined, and the maximum value thereamong is defined as dmax (or AkQk or BkQk+1, whichever is larger, is defined as dmax if PQ does not have an extreme value).

Therefore, if expression (9) is satisfied, then it means that the curve section AkBk is included in the cylinder.

$$d_{max} \le \varepsilon \quad (9)$$

Figure 6:
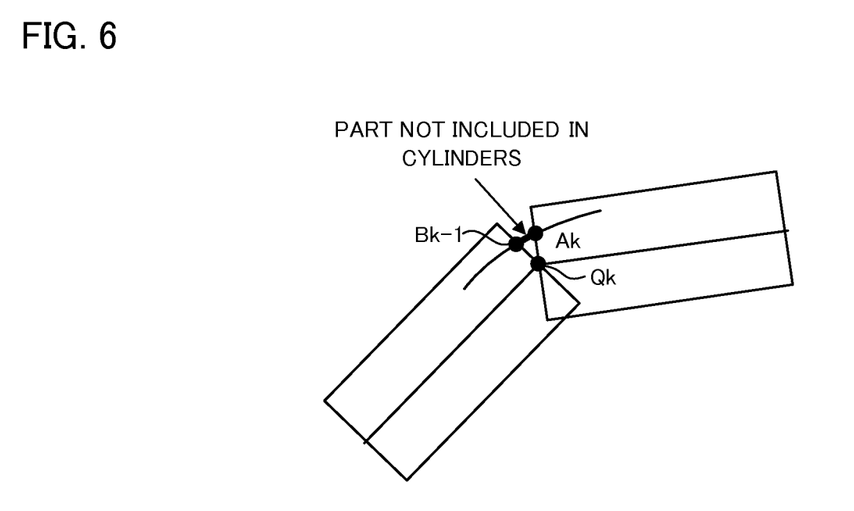
FIG. 6 is a diagram illustrating a curve section not included in the cylinders.

At a place in a connection part between cylinders where the curve is not included in either of the cylinders, as illustrated in FIG. 6, it is verified whether a curve section Bk−1Ak is included in a sphere having the radius ε, Qk being the center thereof. In this case also, as with the cylinders, the extreme value of the length of PQk in the curve section Bk−1Ak is determined. This time, the solution of expression (10) in place of expression (7) is obtained.

$$\vec{C}'(v)(\vec{C}(v)-\vec{Q}_k)=0 \quad (10)$$

Expression (10) is a fifth degree equation. As with the case of the cylinders, the Newton method is applied to obtain the solution.

The position of Bk−1 has already been determined in determining the cylindrical element region. Hence, whether the curve section Bk−1Ak is included in the sphere can be determined using the same procedure as that for the cylinders.

Figure 7:
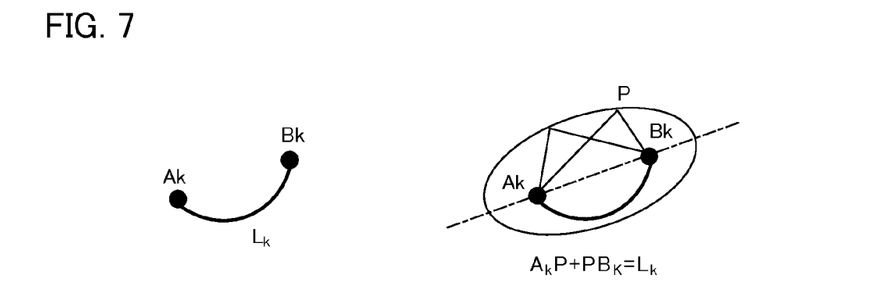
FIG. 7 is a diagram illustrating a spheroid that includes the curve.

A second determination method will now be described. This method is based on the fact that a curve having a length Lk between two points Ak and Bk is included in a spheroid having Ak and Bk as focal points and the sum of the distances from the focal points is Lk, as illustrated in FIG. 7, and the method is used to check whether the spheroid is included in the cylinder. As with the first determination method, another determination method is applied to the cylindrical connection part, so that merely checking whether the spheroid protrudes from the side surface of the cylinder is sufficient, and the case where the spheroid protrudes from the bottom surface thereof is ignored.

Whether the spheroid protrudes from the side surface of the cylinder can be directly determined by projecting the spheroid and the cylinder onto a plane that is orthogonal to the axis of the cylinder. However, a simpler method described below is adopted.

Figure 8:
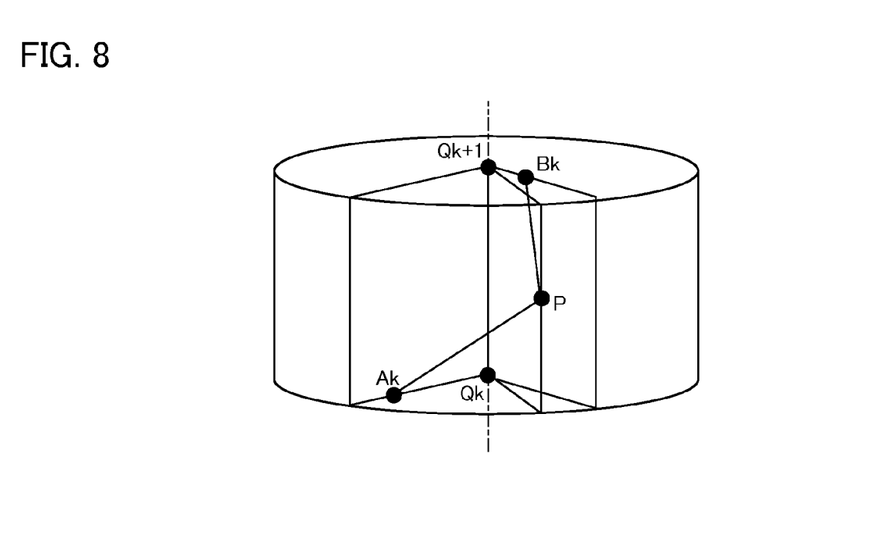
FIG. 8 is a diagram illustrating a path that connects two points via a point on the surface of the cylinder.

As illustrated in FIG. 8, it is determined whether Lk does not exceed the minimum value of the length of the polygonal line path that extends from Ak to Bk via a point P on the side surface of the cylinder. In other words, it is determined whether Lk satisfies expression (11). If Lk satisfies expression (11), then it means that the spheroid does not protrude from the side surface of the cylinder. L1 and L2 denote the lengths of AP and PB, respectively.

$$L_k \le \mathrm{Min}\{L_1+L_2\} \quad (11)$$

Thus, checking whether expression (11) is satisfied makes it possible to determine whether the spheroid protrudes from the side surface of the cylinder, so that the problem to be solved comes down to determining the minimum value of $L_1+L_2$.

The procedure for determining the minimum value will now be described. In a coordinate system having Qk as its origin and QkQk+1 as its Z-axis, when the coordinates of Ak, Bk and P in the coordinate system are defined as $A_k(x_1, y_1, z_1)$, $B_k(x_2, y_2, z_2)$, and $P(x, y, z)$, the relationship represented by expression (12) holds.

$$L=L_1+L_2$$

$$L_1=AP=\sqrt{(x-x_1)^2+(y-y_1)^2+(z-z_1)^2}$$

$$L_2=PB=\sqrt{(x-x_2)^2+(y-y_2)^2+(z-z_2)^2} \quad (12)$$

Therefore, the minimum value of L under the condition defined by expression (13) is determined.

$$x^2+y^2=\varepsilon^2 \quad (13)$$

Expression (13) indicates an extreme value problem with constraint conditions and the solution can be obtained by a well-known method, such as Lagrange's method of undetermined multipliers, Goldstein, Classical Mechanics, Yoshioka Shoten (1967), pp 46-51.

Figure 9:
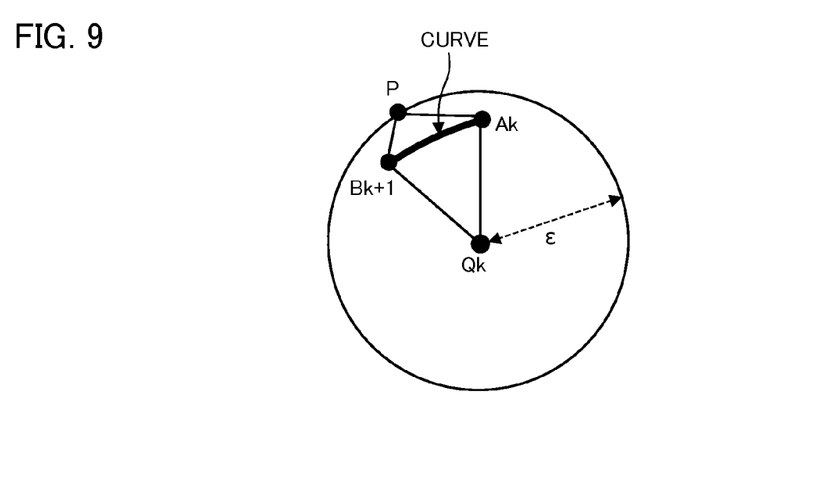
FIG. 9 is a diagram illustrating the curve of the connection part of the cylinder.

The connection part of the cylinder can be also handled as the extreme value problem with constraint conditions. The following will describe the procedure. In this case, it will be verified whether a curve is included in a circle having a center Qk and a radius ε, as illustrated in FIG. 9. When the length of the curve between Bk−1 and Ak is denoted by Lk, the curve does not protrude from the circle if Lk does not exceed the minimum value of the length of the polygonal line that extends from Bk−1 to Ak via a point P on the circumference. Therefore, in a coordinate system having Qk as its origin, when the coordinates of Ak, Bk−1 and P are defined as $A_k(x_2, y_2)$, $B_{k-1}(x_1, y_1)$, and $P(x, y)$, respectively, expression (14) holds.

$$L = L_1 + L_2$$
$$L_1 = \overline{B_{k-1}P} = \sqrt{(x-x_1)^2 + (y-y_1)^2}$$
$$L_2 = \overline{PA_k} = \sqrt{(x-x_2)^2 + (y-y_2)^2} \quad (14)$$

Accordingly, the minimum value of L under the constraint conditions of expression (13) is determined. As with the case of the cylinder, the solution can be obtained by the Lagrange's method of undetermined multipliers.

Figure 10:
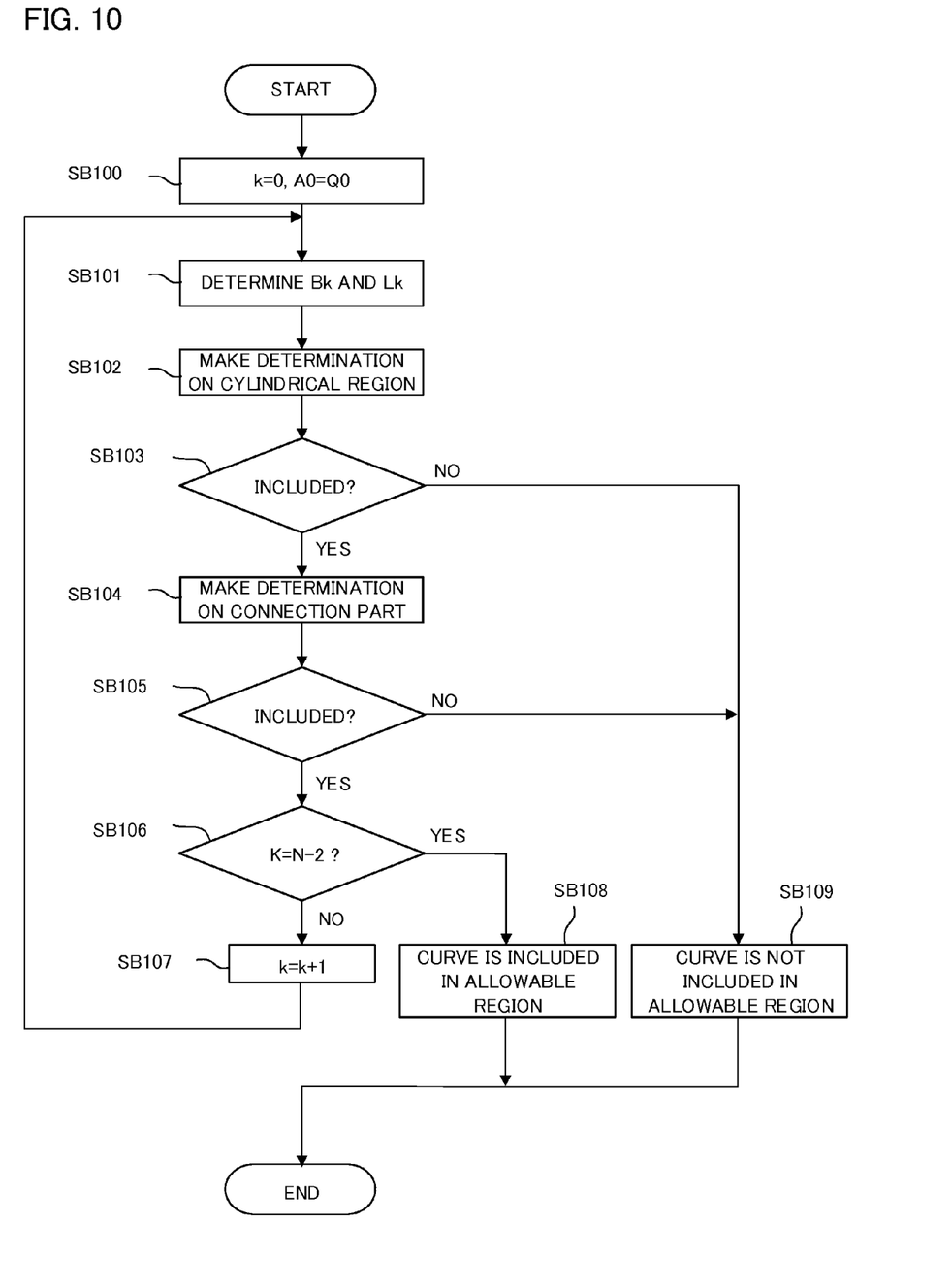
FIG. 10 is a flowchart illustrating the processing of verifying whether a curve section is included in the allowable region.

The procedure for verifying whether a curve is included in an allowable region according to the method described in the foregoing embodiment will be described with reference to the flowchart of FIG. 10.

Step SB100: A curve section is set to an initial value. If k=0, then the curve section corresponds to the one defined by point Q0 and point Q1.

Step SB101: The end point Bk of the curve section and the curve length Lk from the end points Ak and Bk are determined.

Step SB102: The determination is made in the case where the element region is cylindrical, as illustrated in FIG. 5. The procedure will be described in detail later.

Step SB103: If the determination result of step SB102 indicates that the curve section is not included in the cylinder, then the procedure proceeds to step SB109. If the determination result indicates that the curve section is included in the cylinder, then the procedure proceeds to the determination in the connection part in step SB104.

Step SB104: Determination is carried out for the case where the element region is the connection part illustrated in FIG. 6. The procedure will be described in detail later. A last curve section (k=N−2, N denoting the number of points included in a partial point sequence) does not have the connection part, so that the the curve section is determined to be included without carrying out the determination.

Step SB105: If the determination result of step SB104 indicates that the curve section is not included in the connection part, then the procedure proceeds to step SB109. If the determination result indicates that the curve section is included in the connection part, then the procedure proceeds to step SB106.

Step SB106: It is determined whether the curve section is a last one. If the curve section is the last curve section, then the procedure proceeds to step SB108. If the curve section is not the last one, then the procedure proceeds to step SB107.

Step SB107: The procedure increments k by 1 and proceeds to the next curve section and returns to step SB101.

Step SB108: It is determined that the curve is included in the allowable region.

Step SB109: It is determined that the curve is not included in the allowable region.

Figure 11:
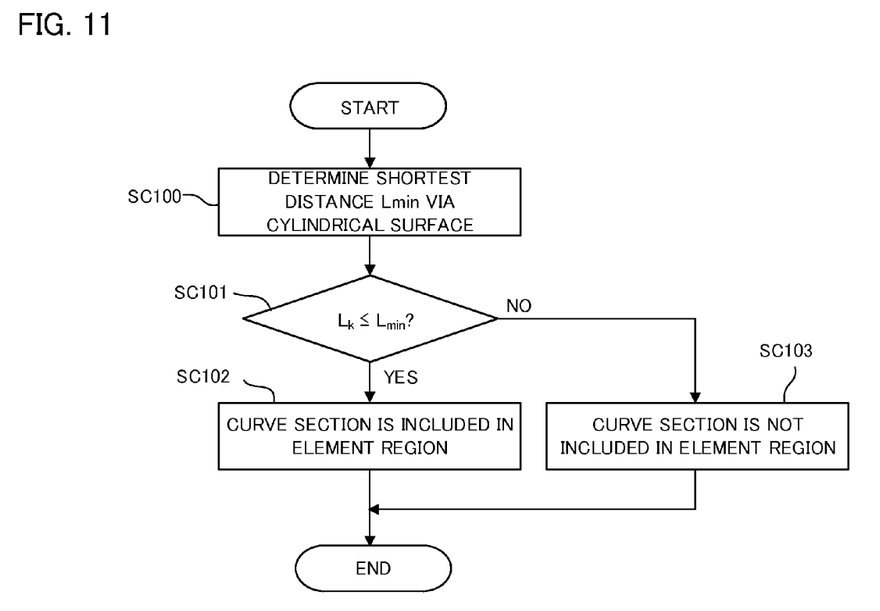
FIG. 11 is a flowchart illustrating the processing of determining whether a curve section is included in the cylindrical element region.

Referring now to the flowchart of FIG. 11, a description will be given of the determination procedure for the case where the element region is cylindrical, as described in connection with the foregoing step SB102.

Step SC100: The curve length Lk from Ak to Bk is determined. Lk is obtained by expression (15).

$$L_k = \int_{v_k}^{v_{k+1}} |\vec{C}'(u)| du \quad (15)$$

where $|\vec{C}'(u)|$ denotes the length of $\vec{C}'(u)$. $v_k$ and $v_{k+1}$ denote the values of parameters at which $\vec{C}'(v_k)$ reaches the position of $A_k$ and $\vec{C}'(v_{k+1})$ reaches the position of $B_k$, and are obtained when the positions of Ak and Bk are determined.

Then, the solutions of the extreme value problems of expression (12) and expression (13) are obtained to provide $L_{min}$.

Step SC101: Expression (11) is assessed, applying Min$\{L_1+L_2\}=L_{min}$. If expression (11) holds, then the procedure proceeds to step SC102, or if not, then the procedure proceeds to step SC103.

Step SC102: It is determined that the curve section is included in the cylindrical region.

Step SC103: It is determined that the curve section is not included in the cylindrical region.

Figure 12:
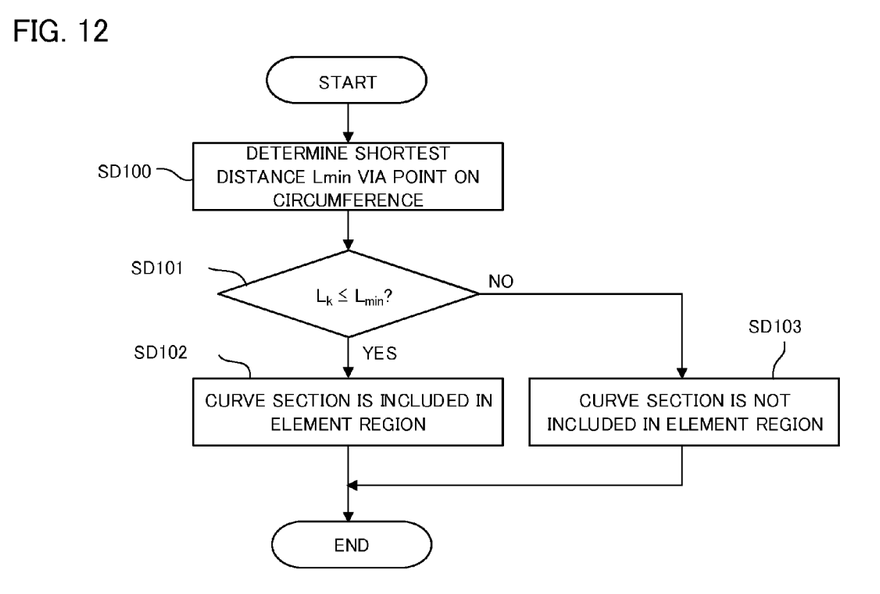
FIG. 12 is a flowchart illustrating the processing of determining whether a curve section is included in a cylindrical connection region.

Referring now to the flowchart of FIG. 12, the determination procedure for the region of the connection part mentioned in connection with the foregoing step SB104 will be described.

Step SD100: The curve length Lk from Bk−1 to Ak is determined. Lk is given by expression (16).

$$L_k = \int_{v_{k-1}}^{v_k} |\vec{C}'(u)| du \quad (16)$$

Then, the solutions of the extreme value problems of expression (14) and expression (13) are obtained to provide $L_{min}$.

Step SD101: Expression (11) is assessed, applying Min$\{L_1+L_2\}=L_{min}$. If expression (11) holds, then the procedure proceeds to step SD102, or if not, then the procedure proceeds to step SD103.

Step SD102: It is determined that the curve section is included in the region of the connection part.

Step SD103: It is determined that the curve section is not included in the region of the connection part.

It should be noted that although the embodiments described above use the B-spline curve as the parametric curve, the extension of the curve to another form, such as the NURBS curve, can be accomplished by modifying the representation form of expression (1) and by applying the same concept.

The invention claimed is:

1. A machine tool, comprising:
  a tool path curve generation apparatus adapted to generate a tool path curve from a tool path designated by command points in a command point sequence, the apparatus comprising a processor configured to:
    define a tolerance region
      which is based on a polygonal line path connecting the command points in the command point sequence,
      which includes the polygonal line path, and
      in which the tool path curve is to be included, determine whether the tool path curve is included in the tolerance region on the basis of a geometric shape of a surface of the tolerance region, and output the tool path curve which has been determined to be included in the tolerance region, wherein the tolerance region includes a plurality of element regions, each element region among the plurality of element regions is a rotating body having a rotation axis that is a segment of the polygonal line path connecting a pair of adjacent command points in the command point sequence, the tool path curve includes a plurality of curve sections each corresponding to an element region among the plurality of element regions, and the processor is configured to determine that a curve section among the plurality of curve sections is included in the corresponding element region when the element region includes a spheroid having ends of the curve section as focal points, and a length of the curve section as a sum of distances from points on the spheroid to the focal points, wherein the processor is configured to determine that the element region includes the spheroid by projecting the spheroid and the element region onto a plane that is orthogonal to the rotation axis of the element region, and the machine tool is configured to machine a workpiece in accordance with the outputted tool path curve.

2. The tool path curve generation apparatus according to claim 1, wherein the geometric shape of the surface of the tolerance region is specifiable by setting.

* * * * *